United States Patent
Rane et al.

(10) Patent No.: US 8,428,379 B2
(45) Date of Patent: Apr. 23, 2013

(54) METHOD FOR DISTRIBUTED SOURCE CODING OF WAVELET COEFFICIENTS IN ZEROTREES

(75) Inventors: Shantanu Rane, Cambridge, MA (US); Yige Wang, Shrewsbury, MA (US); Petros T. Boufounos, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/218,125

(22) Filed: Aug. 25, 2011

(65) Prior Publication Data

US 2013/0051691 A1    Feb. 28, 2013

(51) Int. Cl.
*G06K 9/46* (2006.01)
(52) U.S. Cl.
USPC ............ 382/240; 382/232; 382/233; 382/250
(58) Field of Classification Search .................. 382/232, 382/233, 236, 240, 250, 251; 708/203; 341/79
See application file for complete search history.

(56) References Cited

U.S. PATENT DOCUMENTS

| | | | |
|---|---|---|---|
| 6,674,911 B1 * | 1/2004 | Pearlman et al. | 382/240 |
| 2003/0235338 A1 * | 12/2003 | Dye | 382/232 |
| 2004/0170335 A1 * | 9/2004 | Pearlman et al. | 382/240 |
| 2010/0166057 A1 * | 7/2010 | Huchet et al. | 375/240.01 |

* cited by examiner

*Primary Examiner* — Ali Bayat
(74) *Attorney, Agent, or Firm* — Gene Vinokur; Dirk Brinkman

(57) ABSTRACT

A method for encoding a source image, wherein the source image includes a set of bitplanes of pixels, is disclosed. For each bitplane in a most to least significant order, the method include obtaining a list of significant pixels (LSP), a list of insignificant pixels (LIP), and a list of insignificant sets (LIS) according to a hierarchical ordering of the source image pixels; synchronizing the LSP, LIP and LIS of the source image with the LSP, LIP and LIS of a key image; constructing a temporary list of insignificant sets (TLIS) for the source image; and applying syndrome encoding to the LSP, LIP, and TLIS of the source image to obtain syndromes corresponding to magnitudes and signs of pixels in the source image, wherein the steps are performed in a processor.

9 Claims, 2 Drawing Sheets

METHOD FOR DISTRIBUTED SOURCE CODING OF WAVELET COEFFICIENTS IN ZEROTREES

FIELD OF THE INVENTION

This invention relates generally to distributed source coding, and more particularly to source coding of wavelet-transformed data in zerotrees.

BACKGROUND OF INVENTION

Distributed source coding (DSC) compresses multiple correlated data sources that do not communicate with each other. By modeling a correlation between multiple sources in a decoder with channel codes, DSC shifts the computational complexity from an encoder to the decoder. Therefore, DSC is frequently used in applications with a complexity-constrained encoder, such sensors, satellite imagery, and multimedia compression. In DSC, the correlated sources are encoded separately but decoded jointly. As an advantage, separate encoding of the sources can be performed with a low computational overhead and simpler circuitry.

The DSC framework is based on a lossless Slepian-Wolf compression bound, which states that two isolated sources can compress data as efficiently as though they are communicating with each other. Later, Wyner-Ziv bounds on the rate-distortion performance of a distributed codec showed that there is no loss with respect to conventional compression, for the special case of jointly Gaussian sources. Wyner-Ziv coding has a significant compression advantage compared with discrete cosine transform (DCT) based intra coding or JPEG-like schemes. However wavelet-domain distributed source coding only achieve modest compression gains over their non-distributed counterparts.

Most conventional wavelet-based DSC exploit correlation among wavelet coefficients in much the same way as if the coefficients were DCT coefficients, i.e., conventional DSC performs syndrome encoding of the bitplanes of the source coefficients, and decode the bitplanes using side information coefficients. This does not fully exploit the sparsity structure of a wavelet decomposition, and places distributed source coding at a disadvantage with respect to advanced wavelet-based compression algorithms such as embedded zerotree wavelet (EZW) coding, set partitioning in hierarchical trees (SPIHT), or JPEG2000. Those methods exploit independent coding of zerotrees of wavelet coefficients, i.e., data structures that can represent insignificant wavelet coefficients, or equivalently a significance map of wavelet coefficients, using a small number of bits.

One method applies distributed source coding either directly to the wavelet bitplanes, or to the refinement bits and sign bits generated by wavelet decomposition. However, in this method, the compression of a significance map is still performed using a non-distributed approach such as SPIHT.

SUMMARY OF THE INVENTION

The embodiments of the invention provide a method for distributed source coding (DSC) for encoding and decoding of wavelet-transformed data. Data structures based on zerotrees are used for efficient distributed encoding of a significance map of wavelet coefficients. The coefficients are scanned in two stages, with a first significance pass and a second refinement pass. The bits produces by these two passes are Slepian-Wolf coded using a syndrome code selected from set of available codes.

The invention is based on a realization that for each bitplane of the wavelet coefficients, the significance pass of the source data can be synchronized with the significance pass of the decoder-based side information, enabling distributed coding of the significance and refinement passes. This is substantially different from conventional methods in which the significance pass is coded independently, and the refinement pass is Slepian-Wolf coded.

For example, on embodiment of the invention disclose a method for encoding a source image, wherein the source image includes a set of bitplanes of pixels, comprising, for each bitplane in a most to least significant order, the steps of: obtaining a list of significant pixels (LSP), a list of insignificant pixels (LIP), and a list of insignificant sets (LIS) according to a hierarchical ordering of the source image pixels; synchronizing the LSP, LIP and LIS of the source image with the LSP, LIP and LIS of a key image; constructing a temporary list of insignificant sets (TLIS) for the source image; and applying syndrome encoding to the LSP, LIP, and TLIS of the source image to obtain syndromes corresponding to magnitudes and signs of pixels in the source image, wherein the steps are performed in a processor.

In addition, this method can also include various other optional steps. For example, the method may also optionally include steps of initializing the TLIS to the LIS for the source image; defining an auxiliary list of insignificant sets (ALIS) of the source image, wherein the ALIS contains pixels that descendants of pixels in the TLIS in terms of a wavelet transform decomposition; appending the ALIS to the LIS for the source image; setting the TLIS to the ALIS for the source image; and setting the ALIS to an empty set for the source image.

The method may also optionally include steps of decoding the syndromes corresponding to the magnitude and the sign of each pixels in each bitplane of the source image, wherein the decoding is based on a key image, including obtaining a list of significant pixels (LSP), a list of insignificant pixels (LIP), and a list of insignificant sets (LIS) according to a hierarchical ordering of the key image pixels; defining a temporary list of insignificant sets (TLIS) for the key image; initializing the TLIS to the LIS for the key image; defining an auxiliary list of insignificant sets (ALIS) for the key image, wherein the ALIS contains pixels that descendants of pixels in the TLIS for the key image in terms of a wavelet transform decomposition of the key image; appending the ALIS to the LIS for the key image; setting the TLIS to the ALIS for the key image; setting the ALIS to an empty set for the key image; and applying syndrome decoding to the syndromes corresponding to the magnitudes and the signs of pixels in the source image using the LSP, LIP, TLIS of the key image as side information to reconstruct the source image.

DETAILED DESCRIPTION OF THE PREFERRED EMBODIMENTS

Distributed Coding of Wavelet Zerotrees

Figure 1:
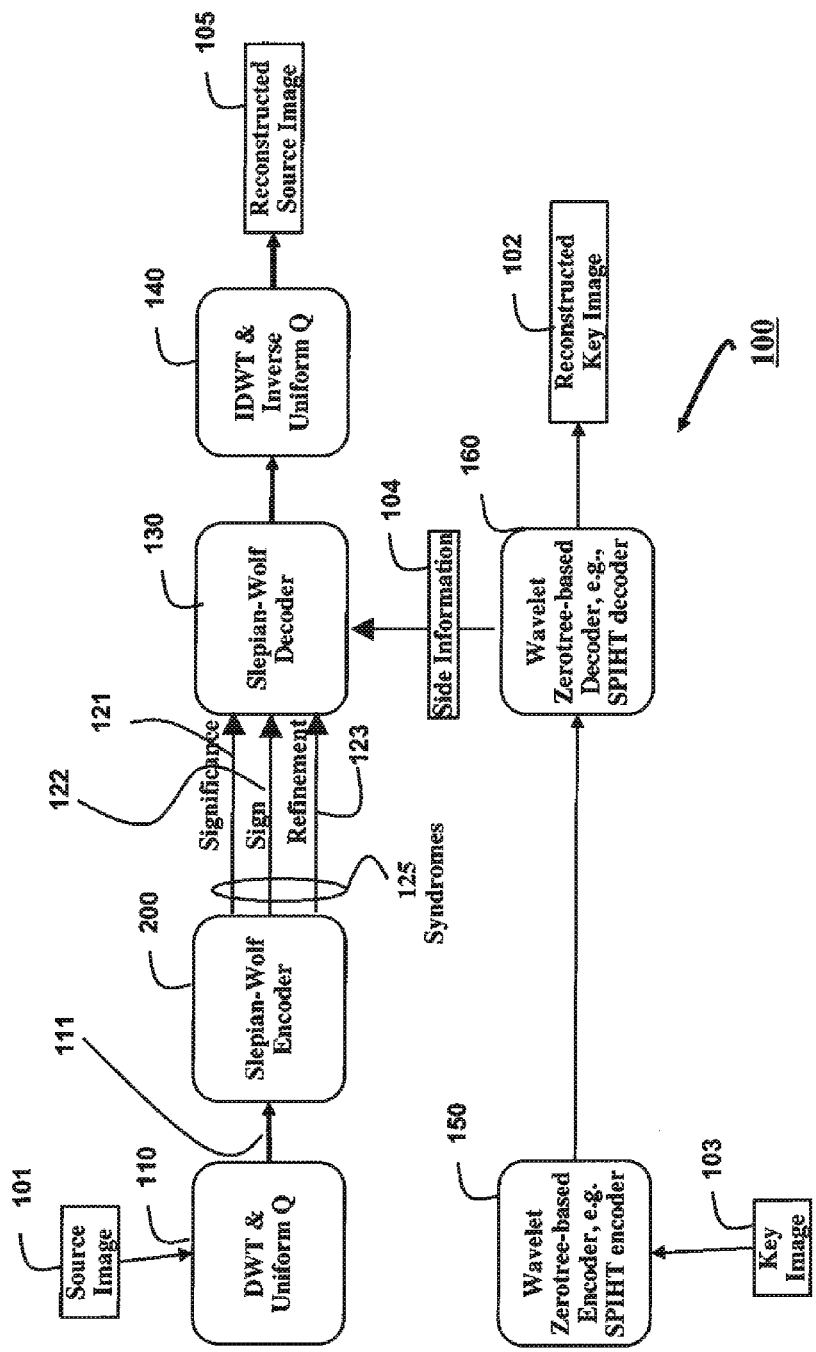
FIG. 1 is a block diagram of a method for distributed source coding according to embodiments of the invention.

FIG. 1 shows a method for a wavelet-domain distributed source coding (DSC) according to embodiments of our invention. The method can be implemented using a processor 100. A discrete wavelet transform (DWT) encodes both frequency and location information. We use an asymmetric DSC in which a source is independently encoded and conditionally decoded in the presence of some correlated side information available only at the decoder. In some embodiments, a source 101 and side information 102 are 2-D images of equal size. We apply 110 a discrete wavelet transform with uniform quantization (Q) to the source image. An identical number of levels of wavelet decomposition are used for the source image and the side information images. The quantized wavelet coefficients 111 are input to a Slepian-Wolf encoder 200.

Side Information

The side information, which can be a previous image in a video sequence, or one channels in a multispectral image, is independently compressed, transmitted and decompressed by a Slepian-Wolf decoder 130. The side information image, also referred to as the key image 103, is used to facilitate "side information decoding" of the source image.

We compress (encode) the side information, i.e., the key image 103 with a wavelet-based compression algorithm. Such algorithms are based on zerotrees of wavelet coefficients or similar data structures. In this embodiment we describe side information decoding and distributed coding based on set partitioning in hierarchical trees (SPIHT) method 150, though embodiments with other zerotree based wavelet-domain compression schemes are also possible; See also FIG. 2. A predetermined number of 2-D wavelet decompositions are applied to the image, followed by uniform quantization. Eventually, a SPIHT decoder 160 recovers the side information 104 for the Slepian-Wolf decoder 130. The SPIHT decoder also outputs the reconstructed key image 102, which may or may not be identical to the side information 104.

An inverse discrete wavelet transform (IDWT) and uniform inverse quantization (Q) are applied 140 to an output of the Slepian-Wolf decoder to obtain a reconstructed source image 105.

Proceeding from a most significant to a least significant bitplane, the SPIHT method stores or communicates a significance map of wavelet coefficients, along with their signs. Magnitudes of the coefficients are encoded in the significance map and in a (second) separate refinement pass.

Distributed Source Encoding

The distributed encoding method encodes the source image 101 such that it can be decoded based on the key image 103 in Wyner-Ziv coding. The method first generates a significance map syndromes 121, refinement syndrome bits 122, and sign syndrome bits 123 and encodes these bits into a bit stream of syndromes 125 that are nearly incompressible, i.e., an entropy encoder can only improve the compression ratio by a small amount. Therefore, the entropy coder can omitted for low complexity encoding. Generation of the syndromes from the significance map bits, refinement bits and sign bits is called Slepian-Wolf encoding 120, which can be performed using a low-density parity-check (LDPC) syndrome code. Due to synchronization requirements at the decoder, our distributed version of SPIHT differs from the conventional SPIHT, as described below. If different wavelet zerotree-based algorithms such as Embedded Zerotree Wavelets (EZW) or JPEG2000 are used, similar changes would be necessary to maintain synchronization at the decoder.

Figure 2:
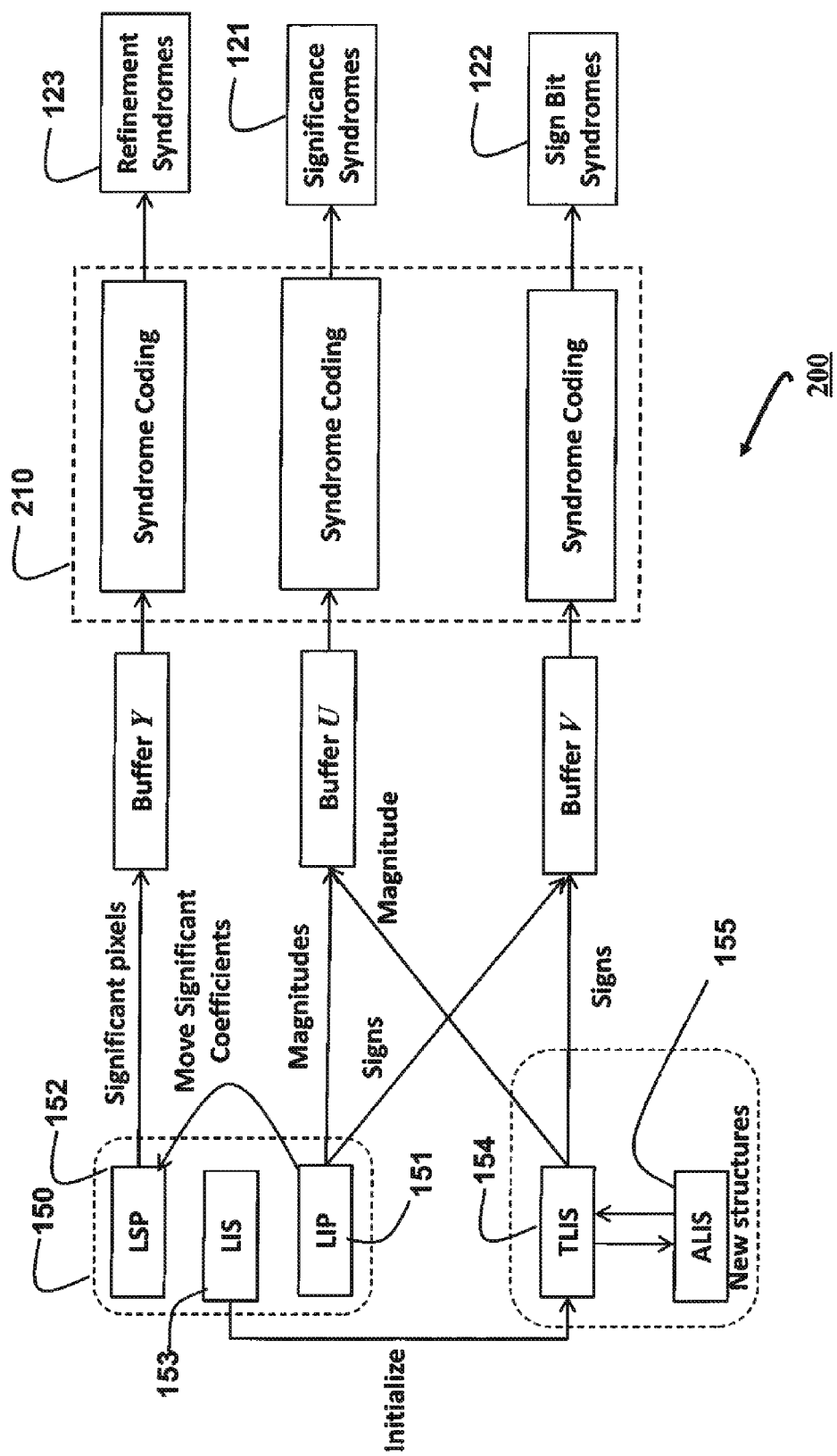
FIG. 2 is a block diagram of a Slepian-Wolf encoder according to embodiments of the invention.

As shown in FIG. 2, the significant pixels, magnitudes, and signs are stored in buffers Y, U, and V for syndrome coding 210 to obtain the refinement syndromes 123, significance syndromes 121, and sign bit syndromes 122, respectively. The above encoding and decoding steps can be performed in an encoder and a decoder, or a codec.

After the 2-D wavelet transform and the uniform quantization are applied 110 to the source image 101, we construct a spatial orientation zerotree from the wavelet decomposition. Each node of the tree corresponds to a wavelet coefficient identified by its spatial coordinate, as $c_{i,j}$.

Each node has either zero direct descendants in a next finer wavelet decomposition level or four direct descendants arranged in a 2×2 array of adjacent wavelet coefficients. Descendants of a node, which are not direct descendants, are referred to as indirect descendants. In the embodiment described, the data structures are based on the SPIHT wavelet coding algorithm. In other embodiments, different wavelet-based coding algorithms such as Embedded Zerotree Wavelet coding (EZW) and JPEG2000 may be used.

As in SPIHT, we use the following sets:

O(i,j) is the set of coordinates of direct descendants of node (i,j). This set is either empty or has 4 elements.

D(i,j) is the set of all descendants of node (i,j)

$$L(i,j)=D(i,j)-O(i,j)$$

As in SPIHT, we also define the following lists:
List of Insignificant Pixels (LIP) 151,
List of Significant Pixels (LSP) 152, and
List of Insignificant Sets (LIS) 153.

In addition, and different from SPIHT, we also define a Temporary List of Insignificant Sets (TLIS) 154, and an Auxiliary List of Insignificant Sets (ALIS) 155.

The lists are initialized and used by the Slepian-Wolf encoder 200 shown in FIG. 2. The steps of the encoder procedure can be performed in a processor connected to a memory and input/output interfaces as known in the art. Specialized hardware, such a codec can also be used.

We also define a significance function of a coordinate set A for bitplane n as:

$$S_n(A) = \begin{cases} 1 & \text{if } \max_{(i,j) \in A} |c_{i,j}| \geq 2^n \\ 0 & \text{otherwise,} \end{cases}$$

where the function max returns a maximum value.

Each iteration of the encoder 200 results in a different number of bits signaling the significance map. Furthermore, the number of sign bits and refinement bits depend on the significance map. Thus, in each iteration, a Slepian-Wolf code with a different rate is required. In practice, syndromes derived from the LDPC codes of different rates are used as Slepian-Wolf codes.

The sequence of operations used to populate the LIS, LIP and LSP and extract bits from these sets in the Slepian-Wolf encoding is different from that used in the conventional SPIHT procedure to enable causal decoding of the side information without losing synchronization between the source and the key images.

In contrast with the conventional SPIHT method, in which the bit stream is generated at the encoder bit by bit, and parsed at the decoder in the same sequence, our method maintains causality and synchronization for blocks of syndromes. This means that, unlike SPIHT, for every bit-plane, bits derived from the LIP are compressed first, followed by bits derived from the LIS, followed by bits derived from the LSP. Specifically, for bits derived from the LIS, the coefficients with direct descendants are encoded separately from those with indirect descendants.

Side Information Decoding

The decoder 130 is similar to the encoder, with the following differences. First, the operations are performed on the side information image. Second, the corresponding side information bits are replaced with the corrected bits and U is cleared. In the error correction step, the correlation between the source and the side information is exploited. When the correlation is high, the number of syndromes required for error correction is significantly smaller than the size of Buffers U, V, or Y, as the case may be.

After the decoding completes, the side information bit stream is transformed into a reconstructed error-free SPIHT bit stream for the source image, which can then be decoded in the usual way. Because the procedure is based on SPIHT, it is possible to decode bitplane-by-bitplane and stop whenever the desired image quality is obtained, and extra syndromes may be neglected.

Predictors for Significance, Sign and Refinement Bits

The distribution of the source given the side information determines an initial log-likelihood ratios (LLR) used by the LDPC belief propagation decoder. In some embodiments, While decoding the significance map and the sign bits, it is assumed that the bits are independent and identically distributed (i.i.d.) with a Bernoulli-p distribution. The value p is determined experimentally by measurements on similar data sets. In other embodiments, different distributions on the significance map and sign bits are possible.

The refinement pass bits are decoded after the significance map and sign bits for a given bitplane are decoded. Thus, the side information decoding of the refinement bits is exactly like side information decoding used in many distributed video coding schemes, i.e., conditioned on the value of the wavelet coefficients of the side information. In some embodiments, the corresponding values of the wavelet coefficients of the source given the side information are distributed according to a Laplace distribution.

For 2D images with d levels of decomposition, there are 3d+1 subbands, and a different Laplacian parameter is used for each subband. The values of the Laplacian parameters are determined from measurements on similar datasets.

EFFECT OF THE INVENTION

This invention develops an efficient distributed source coding algorithm for wavelet-transformed data. Our approach exploits correlations not only between the wavelet coefficients of correlated sources but also between their sparsity structure, i.e. between the locations of large wavelet coefficients in the key image and source image.

The method according to the invention can compress multispectral images, hyperspectral images, video sequences, image arrays in light fields, and any visual or non-visual data in which there is an observed correlation in time, space, frequency, etc.

As a significant advantage of our distributed method, the significance map is compressed significantly. Encoding the significance map in the prior art usually accounts for more than 50% of the total bit budget in SPIHT or JPEG2000. By exploiting correlations among the significance maps of the source and the side information images, our method reduces the overhead of the significance map, and increases compression efficiency.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding a source image, wherein the source image includes a set of bitplanes of pixels, comprising, for each bitplane in a most to least significant order, the steps of:
    obtaining a list of significant pixels (LSP), a list of insignificant pixels (LIP), and a list of insignificant sets (LIS) according to a hierarchical ordering of the source image pixels;
    synchronizing the LSP, LIP and LIS of the source image with the LSP, LIP and LIS of a key image;
    constructing a temporary list of insignificant sets (TLIS) for the source image; and
    applying syndrome encoding to the LSP, LIP, and TLIS of the source image to obtain syndromes corresponding to magnitudes and signs of pixels in the source image, wherein the steps are performed in a processor.

2. The method of claim 1, wherein the constructing further comprises:
    initializing the TLIS to the LIS for the source image;
    defining an auxiliary list of insignificant sets (ALIS) of the source image, wherein the ALIS contains pixels that descendants of pixels in the TLIS in terms of a wavelet transform decomposition;
    appending the ALIS to the LIS for the source image;
    setting the TLIS to the ALIS for the source image; and
    setting the ALIS to an empty set for the source image.

3. The method of claim 1, wherein the source image is an image that is correlated with the key image.

4. The method of claim 1, wherein the source image is an image in a multispectral image dataset.

5. The method of claim 1, wherein the source image is an image in a hyperspectral image dataset.

6. The method of claim 1, wherein the source image is a video frame.

7. The method of claim 1, wherein the key image is independently compressed and input to a decoder.

8. The method of claim 1, wherein the syndrome encoding uses a low-density parity-check (LDPC) syndrome code.

9. The method of claim 1, further comprising:

decoding the syndromes corresponding to the magnitude and the sign of each pixels in each bitplane of the source image, wherein the decoding is based on a key image, and further comprising:

obtaining a list of significant pixels (LSP), a list of insignificant pixels (LIP), and a list of insignificant sets (LIS) according to a hierarchical ordering of the key image pixels;

defining a temporary list of insignificant sets (TLIS) for the key image;

initializing the TLIS to the LIS for the key image;

defining an auxiliary list of insignificant sets (ALIS) for the key image, wherein the ALIS contains pixels that descendants of pixels in the TLIS for the key image in terms of a wavelet transform decomposition of the key image;

appending the ALIS to the LIS for the key image;

setting the TLIS to the ALIS for the key image;

setting the ALIS to an empty set for the key image; and applying syndrome decoding to the syndromes corresponding to the magnitudes and the signs of pixels in the source image using the LSP, LIP, TLIS of the key image as side information to reconstruct the source image.

* * * * *